P. A. WESTLIN.
DIVIDERS.
APPLICATION FILED APR. 19, 1917.
1,250,259.
Patented Dec. 18, 1917.
2 SHEETS—SHEET 1.
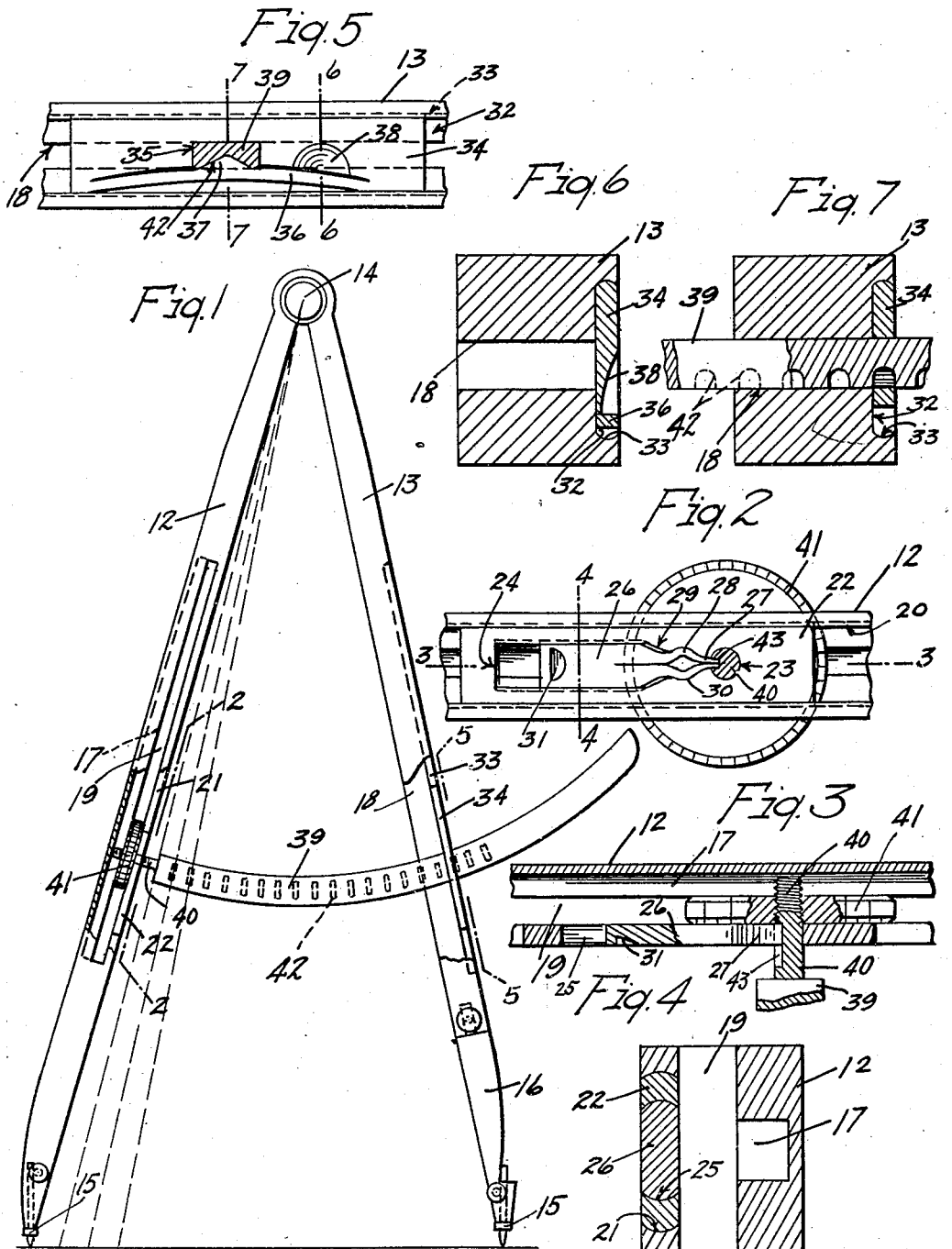
WITNESSES
E. G. Wells
H. L. Opsahl.
INVENTOR
Peter A. Westlin
BY HIS ATTORNEYS
Williamson & Merchant.

P. A. WESTLIN.
DIVIDERS.
APPLICATION FILED APR. 19, 1917.
1,250,259.
Patented Dec. 18, 1917.
2 SHEETS—SHEET 2.
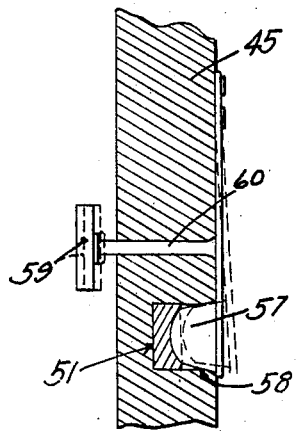
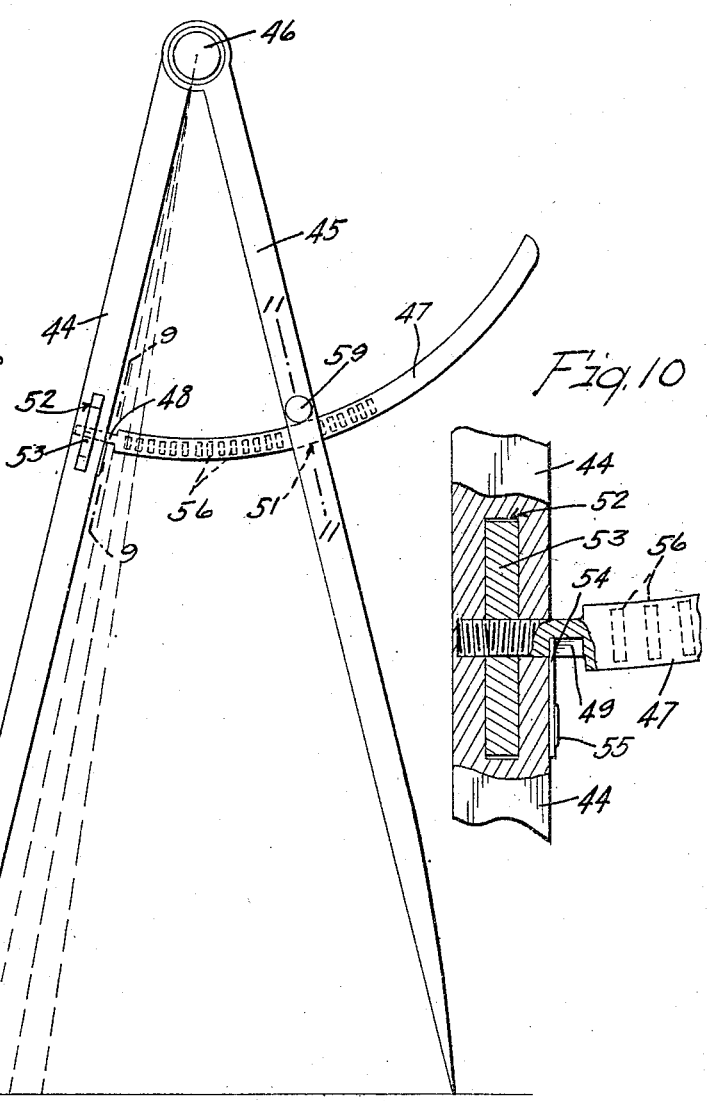
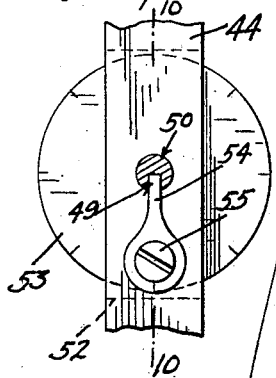
WITNESSES
E. C. Wells
H. L. Opsahl.
INVENTOR
Peter A. Westlin
BY HIS ATTORNEYS
Williamson Merchant

UNITED STATES PATENT OFFICE.

PETER A. WESTLIN, OF MINNEAPOLIS, MINNESOTA.

DIVIDERS.

1,250,259.  Specification of Letters Patent.  Patented Dec. 18, 1917.

Application filed April 19, 1917. Serial No. 163,145.

*To all whom it may concern:*

Be it known that I, PETER A. WESTLIN, a citizen of the United States, residing at Minneapolis, in the county of Hennepin and State of Minnesota, have invented certain new and useful Improvements in Dividers; and I do hereby declare the following to be a full, clear, and exact description of the invention, such as will enable others skilled in the art to which it appertains to make and use the same.

My invention relates to improvements in dividers or compasses, and more particular to means for adjusting the same. To the above end, generally stated, the invention consists of the novel devices and combinations of devices, hereinafter described and defined in the claims.

In the accompanying drawings, which illustrate the invention, like characters indicate like parts throughout the several views.

Referring to the drawings:

Figure 1 is a view showing one form of the invention, with some parts broken away;

Fig. 2 is a fragmentary detail view, with some parts sectioned on the line 2—2 of Fig. 1, on an enlarged scale;

Fig. 3 is a fragmentary detail view partly in elevation and partly in section, taken on the line 3—3 of Fig. 2;

Fig. 4 is a detail view in section taken on the line 4—4 of Fig. 2, on an enlarged scale;

Fig. 5 is a fragmentary detail view with some parts sectioned on the line 5—5 of Fig. 1, on an enlarged scale;

Fig. 6 is a detail view in section taken on the line 6—6 of Fig. 5, on an enlarged scale;

Fig. 7 is a detail view, principally in section, taken on the line 7—7 of Fig. 5, on an enlarged scale;

Fig. 8 is a view showing another form of the invention;

Fig. 9 is a fragmentary detail view with some parts sectioned on the line 9—9 of Fig. 8, on an enlarged scale;

Fig. 10 is a detail view, partly in elevation, and partly in section, taken on the line 10—10 of Fig. 9, on an enlarged scale; and Fig. 11 is a detail view, principally in section, taken on the line 11—11 of Fig. 8, on an enlarged scale.

Referring first to the construction shown in Figs. 1 to 7 inclusive, the numerals 12 and 13 indicate the leg members of the compasses and which leg members are pivotally connected by a head 14 and provided with adjustable needle points 15. The leg member 13 is provided with a removable section 16 which can be removed and a like section, having either a pen or pencil, substituted therefor. Formed in the inner face of the leg member 12 is a long channel 17 and alined therewith and formed in the leg member 13 is a long slot 18. Also formed in the leg member 12 is a long slot 19 which transversely intersects the channel 17, as best shown in Fig. 4. The channel 17 and slots 18 and 19 all extend substantially radially from the pivot head 14.

The width of the channel 17, at the inner face of the leg member 12, is increased to afford a way 20 having in its longitudinal edges segmental seats 21 in which is mounted a slide 22. Extending transversely through the slide 22 is an annular seat 23, and also formed in said slide is a way 24 which extends radially from the seat 23. In the longitudinal edges of the way 24 are segmental seats 25 adapted to receive and hold a latch plate 26 with freedom for sliding movement radially toward and from the seat 23. On the end of the lock plate 26, adjacent to the seat 23, is a pair of spring fingers 27, under strain to separate and arranged to be moved into and out of the seat 23. These fingers 27 are intermediately and outwardly bowed at 28, and when the lock plate 26 is moved toward the seat 23, enter a contracted neck portion 29 in the way 24 and are thereby pressed toward each other. At the limit of the movement of the fingers 28 into the seat 23, their bowed portions 28 enter concave seats 30 formed in the longitudinal edges of the neck portion 29, and are yieldingly held with the outer edges of their fingers 27 projecting into the seat 23. In the outer face of the lock plate 26 is cut a finger hole 31 by which said lock plate may be moved away from the seat 23. The purpose of the fingers on the lock plate 26 will presently appear.

The width of the slot 18 at the outer face of the leg member 13 is increased to afford a way 32 having in its longitudinal edges segmental seats 33 in which is mounted a slide 34. In the intermediate portion of the slide 34 is formed a rectangular seat 35 which extends transversely therethrough. Also formed with the slide 34 is a bow spring 36 which in turn forms one side of the seat 35 and has integral therewith a V-shaped lock lug 37 that projects into said seat. At one side of the spring 36 the slide 34 is cut away at 38 to permit the operator to engage said spring with his thumb and move the same to retract the lock lug 37.

The leg members 12 and 13 are adjustably connected by a scale 39, in the form of a flat segmental bar, mounted in the seat 35 with freedom for endwise sliding movement and having its inner end reduced to form a screw-threaded stem 40 which projects through the seat 23 and into the channel 17. A micrometer nut 41 provided for imparting endwise adjustments to the scale 39 is mounted in the slot 19, held thereby against axial movement and has screw-threaded engagement with the stem 40. In one side of the scale 39 are formed a multiplicity of transverse detent notches 42 with any one of which the lock lug 37 coöperates to secure the scale 39 to the leg 13.

Cut in the stem 40 is a longitudinally extended slot 43 into which the fingers 27 project and hold said stem against rotation, but with freedom for limited endwise movement. The fingers 27, when engaged by the stem 40 at the outer end of its slot 43, act as a stop to limit the endwise movement of the scale 39 and thereby prevent said stem from being completely removed from the micrometer nut 41.

From the above description it is evident that by moving the slides 22 and 34 in the ways 20 and 32, respectively, the scale 39 may be adjusted bodily and radially toward and from the pivot head 14. It is evident that, when the leg member 13 is adjusted to register with different notches of the scale 3, the ratio of such adjustment, as indicated by the scale, to the corresponding relative movement of the leg points, will remain fixed, so long as the position of the scale in relation to the leg 12 remains unchanged; but by adjusting the scale toward or from the pivot head 14, the ratio of any movement of the leg member 13, as indicated by the scale, to the resulting relative movement of the leg points, will be unchanged.

Referring now to the construction shown in Figs. 8 to 11 inclusive, the numerals 44, 45, and 46 indicate, respectively, the leg members and the pivot head of a pair of plain dividers. The leg members 44 and 45 are adjustably connected by a scale 47 identical with the scale 39, and having at its inner end a screw-threaded stem 48 with a longitudinally extended slot 49 formed thereon. The stem 48 is mounted with freedom for endwise movement in an annular seat 50, formed in the leg member 44, and the body member of the scale 47 is mounted with freedom for endwise sliding movement in a rectangular seat 51 formed in the leg member 45. A longitudinally extended slot 52 is formed in the leg member 44, transversely intersects the seat 50 and has mounted therein a micrometer nut 53 which is held therein against axial movement. This micrometer nut 53 has screw-threaded engagement with the stem 48 and is provided for imparting endwise movement to the scale 47 with reference to the leg member 44. The stem 48 is held against rotation in the seat 50 and against removal from the micrometer nut 53 by a finger 54 extending into the slot 49 and secured to the leg member 44 by a screw 55.

In one side of the scale 47 are a multiplicity of detent notches 56 with any one of which a spring latch 57, secured to the leg member 45, coöperates to secure said leg member to the scale 47. The latch 57 works in a seat 58 formed in the leg member 45 and which transversely intersects the seat 51. The spring latch 57 is provided with a thumbpiece-equipped stem 59 which works in a passageway 60, formed in the leg member 45, and by which stem the latch 57 may be operated to carry the same out of interlocking engagement with one of the detent notches 56.

Obviously by adjusting the leg member 45 on the scale 47, the points of the divider may be set at a predetermined distance apart. To obtain different spacing of the scale notches, a plurality of interchangeable scales may be provided each having its detent notches spaced differently from those of the others.

What I claim is:

1. A divider or compasses comprising a pair of pivotally connected leg members each having a scale slot, one of said leg members having a longitudinal slot transversely intersecting the scale seat of such member, a latch on the other of said leg members and normally extending into its scale seat, a scale having detent notches, one end of the scale being mounted in the first noted scale seat, a micrometer nut mounted in said slot, held thereby against axial movement and having screw-threaded engagement with the adjacent end of the scale, and means for holding the scale against turning movement in the first noted scale seat, but with freedom for limited endwise movement, the body of the scale being mounted for endwise sliding movement in the other of said scale seats and with the detent notches of which said latch coöperates.

2. A divider or compasses comprising a pair of pivotally connected leg members, a slide mounted on each of the leg members for radial movement with respect to the pivotal connection thereof, a scale having detent notches, a micrometer nut connecting one end of the scale to one of the slides, and a latch coöperating with said detent notches and connecting the body of the scale to the other of said slides.

In testimony whereof I affix my signature in presence of two witnesses.

PETER A. WESTLIN.

Witnesses:
MAY A. SMITH,
HARRY D. KILGORE.

Copies of this patent may be obtained for five cents each, by addressing the "Commissioner of Patents, Washington, D. C."